(12) United States Patent
Edwards

(10) Patent No.: US 7,954,679 B2
(45) Date of Patent: *Jun. 7, 2011

(54) RETENTION SYSTEM FOR A SPARE TIRE

(75) Inventor: David Michael Edwards, Marysville, OH (US)

(73) Assignee: Honda Motor Company, Ltd., Tokyo (JP)

( * ) Notice: Subject to any disclaimer, the term of this patent is extended or adjusted under 35 U.S.C. 154(b) by 606 days.

This patent is subject to a terminal disclaimer.

(21) Appl. No.: 10/894,488

(22) Filed: Jul. 20, 2004

(65) Prior Publication Data

US 2006/0017301 A1    Jan. 26, 2006

(51) Int. Cl.
*B62D 43/06* (2006.01)

(52) U.S. Cl. ............... 224/42.21; 224/281; 224/403; 296/37.2; 296/37.6

(58) Field of Classification Search ............... 224/42.2, 224/42.12, 42.14, 42.21, 281, 518, 403, 42.23, 224/42.29, 538; 296/37.2, 37.14, 182.1, 296/37.6, 184.1

See application file for complete search history.

(56) References Cited

U.S. PATENT DOCUMENTS

| | | |
|---|---|---|
| 2,014,019 A | 9/1935 | Girl |
| 2,063,092 A | 12/1936 | Groden |
| 2,091,069 A | 8/1937 | Girl |
| 2,091,070 A | 8/1937 | Girl |
| 2,091,071 A | 8/1937 | Girl |
| 2,094,401 A | 9/1937 | Girl |
| 2,140,615 A | 12/1938 | Biszantz |
| 2,547,083 A | 4/1951 | Lundgren |
| 2,792,137 A | 5/1957 | Solomon et al. |
| 3,559,829 A | 2/1971 | Shamel |
| 3,880,335 A * | 4/1975 | Winkler ............... 224/42.13 |
| 3,940,041 A | 2/1976 | Bott |
| 4,072,258 A | 2/1978 | Cruson |
| 4,093,088 A | 6/1978 | Hildebrandt et al. |
| 4,230,246 A * | 10/1980 | Wilson ............... 224/42.21 |
| 4,312,620 A | 1/1982 | Muschalek, Jr. |
| 4,418,852 A | 12/1983 | Grinwald |
| 4,441,771 A * | 4/1984 | Roesler ............... 312/322 |

(Continued)

FOREIGN PATENT DOCUMENTS

JP    56160233 A    12/1981

(Continued)

OTHER PUBLICATIONS

Kerry Stephen McClure et al., Copending U.S. Appl. No. 10/663,889, filed Sep. 16, 2003.

(Continued)

*Primary Examiner* — Justin M Larson
(74) *Attorney, Agent, or Firm* — Ulmer & Berne LLP

(57) ABSTRACT

A retention system for a vehicular spare tire includes a chamber having a bottom portion. A tray is configured for movement in a first direction relative to the bottom portion between an extended position and a stored position. At least one removable interconnecting member is configured to selectively interface with both the tray and the chamber for substantially preventing movement of the tray relative in the first direction. At least one guide member is configured to selectively interface with a back portion of the tray for substantially preventing movement of the back portion of the tray in a second direction relative to the bottom portion while the tray is in the stored position. The second direction is generally perpendicular to the first direction.

25 Claims, 4 Drawing Sheets

U.S. PATENT DOCUMENTS

| | | | |
|---|---|---|---|
| 4,455,948 A | | 6/1984 | Torres |
| 4,632,288 A | | 12/1986 | Bullock |
| 4,676,415 A | * | 6/1987 | Kennedy .................. 224/489 |
| 4,711,382 A | | 12/1987 | Helterbrand |
| 4,736,689 A | | 4/1988 | Stanko |
| 4,795,302 A | | 1/1989 | Dalton |
| 4,884,729 A | | 12/1989 | Barkouskie |
| 4,976,384 A | * | 12/1990 | Daniels .................. 224/42.23 |
| 5,026,107 A | | 6/1991 | Hess |
| 5,065,920 A | * | 11/1991 | Amner .................... 224/275 |
| 5,222,640 A | * | 6/1993 | Teson ..................... 224/403 |
| 5,238,358 A | * | 8/1993 | Higgins et al. ............ 414/463 |
| 5,484,198 A | | 1/1996 | Pilliod |
| D377,470 S | * | 1/1997 | Santangelo ............... D12/202 |
| 5,860,786 A | | 1/1999 | Aubrecht |
| 5,938,262 A | * | 8/1999 | Mills .................... 296/26.09 |
| 5,951,232 A | | 9/1999 | Yu et al. |
| 5,957,346 A | | 9/1999 | Schambre et al. |
| 5,993,133 A | | 11/1999 | Murray et al. |
| 6,053,690 A | * | 4/2000 | Hanson .................. 414/463 |
| 6,155,625 A | | 12/2000 | Felix |
| 6,279,793 B1 | * | 8/2001 | Treis .................. 224/42.23 |
| 6,308,873 B1 | * | 10/2001 | Baldas et al. ............. 224/281 |
| 6,422,567 B1 | | 7/2002 | Mastrangelo et al. |
| 6,474,715 B2 | * | 11/2002 | Fukushima et al. ......... 296/37.1 |
| 6,516,983 B2 | | 2/2003 | Sotiroff et al. |
| 6,546,598 B1 | * | 4/2003 | Nakanou et al. ........... 224/281 |
| 6,880,875 B2 | * | 4/2005 | McClure et al. ........... 296/37.14 |
| 6,883,851 B2 | * | 4/2005 | McClure et al. ........... 296/37.14 |
| 6,926,348 B2 | * | 8/2005 | Krueger et al. ............ 296/184.1 |
| 7,410,081 B2 | | 8/2008 | McClure et al. |
| 7,900,989 B2 | * | 3/2011 | Edwards .................. 296/37.2 |
| 2004/0105744 A1 | * | 6/2004 | Warner et al. ............. 414/522 |
| 2005/0236860 A1 | * | 10/2005 | Nagamoto et al. ......... 296/37.14 |

FOREIGN PATENT DOCUMENTS

| | | |
|---|---|---|
| JP | 60016684 | 2/1985 |
| JP | 06027459 U | 4/1994 |
| JP | 0674591 U | 10/1994 |

OTHER PUBLICATIONS

Official Action, Dispatch date of Apr. 4, 2008, Chinese Patent Application No. 200510087518.4, 31 pages.

Official Action, Dispatch date of Sep. 26, 2008, Chinese Patent Application No. 200510087518.4, 15 pages.

Official Action, Dispatch date of Aug. 21, 2009, Chinese Patent Application No. 200510087518.4, 8 pages.

Official Action, Dispatch date of May 28, 2010, Chinese Patent Application No. 200510087518.4, 22 pages.

Notice of Preliminary Rejection, Draft date of Sep. 29, 2010, Japanese Patent Application No. 2005-209609, Mailing Date Oct. 5, 2010.

* cited by examiner

RETENTION SYSTEM FOR A SPARE TIRE

TECHNICAL FIELD

The present invention relates to a retention system for a spare tire on a vehicle. More particularly, the retention system includes a slidable tray for supporting a spare tire. The tray can be selectively retained within a chamber by the combination of one or more removable interconnecting members and one or more guide members.

BACKGROUND OF THE INVENTION

Conventionally, spare tires have created design and storage problems in many vehicles, particularly pickup trucks. For example, a spare tire for a pickup truck is often hung beneath a pickup truck in a position below the truck bed. However, it can be difficult to access such a spare tire, and this storage arrangement also typically renders the spare tire subject to theft and/or environmental damage.

As an alternative, a storage compartment might be provided, for example, beneath the bed of a pickup truck or beneath the trunk floor of an automobile, into which storage compartment the spare tire may be slid. In this alternative arrangement, a slidable tray might be provided to support the spare tire with respect to the storage compartment and to facilitate easy sliding of the spare tire to/from the storage compartment. It may be desirable under certain circumstances to prohibit this slidable tray from moving horizontally or vertically, such as for example during vehicular travel. However, as a vehicle's spare tire is not typically accessed more than a few times during the useful life of the vehicle, a complicated, bulky, and/or expensive tray retention system is not typically desirable. Accordingly, there is a need for a simple, lightweight and cost-effective spare tire retention system that involves a slidable storage tray that can be selectively prohibited from moving.

SUMMARY OF THE INVENTION

Accordingly, it is an aspect of the present invention to provide a simple, lightweight and cost-effective spare tire retention system that involves a slidable storage tray that can be selectively prohibited from moving. To achieve the foregoing and other aspects, and in accordance with the purposes of the present invention defined herein, retention systems for a spare tire are herein provided.

In accordance with one exemplary embodiment of the present invention, a retention system comprises a chamber having a bottom portion. A tray is configured for movement in a first direction relative to the bottom portion of the chamber between an extended position and a stored position. At least one removable interconnecting member is configured to selectively interface with both the tray and the chamber for substantially preventing movement of the tray in the first direction. At least one guide member is configured to selectively interface with a back portion of the tray for substantially preventing movement of the back portion of tray in a second direction relative to the bottom portion of the chamber while the tray is in the stored position. The second direction is generally perpendicular to the first direction.

In accordance with another exemplary embodiment of the present invention, a retention system for a spare tire comprises a chamber having a bottom portion, a rear portion and an aperture. A tray is configured to support a spare tire and is further configured for movement in a first direction relative to the bottom portion of the chamber between an extended position and a stored position. The tray defines an aperture that substantially aligns with the aperture in the chamber while the tray is in the stored position. A removable pin is configured to selectively interface the tray and the chamber through the substantially aligned apertures for substantially preventing movement of the tray in the first direction. The pin has an upper body and a lower body, wherein the upper body includes a gripping member and the lower body has threads. The lower body is configured to selectively interface the aperture in the chamber. At least one stopper is attached to the rear portion of the chamber. The stopper is configured to selectively interface with a back portion of the tray for substantially preventing movement of the back portion of the tray in a second direction relative to the bottom portion of the chamber while the tray is in the stored position. The second direction is generally perpendicular to the first direction.

In accordance with another exemplary embodiment of the present invention, a retention system for a spare tire comprises a chamber having a bottom portion and a rear portion. The bottom portion defines a first aperture and a second aperture. A tray is configured to support a spare tire and is slidable with respect to the chamber between stored and extended positions. The tray has a front portion and a back portion. The tray defines first and second apertures proximal to the front portion of the tray. The first aperture in the tray substantially aligns with the first aperture in the chamber while the tray is in the stored position. The second aperture in the tray substantially aligns with the second aperture in the chamber while the tray is in the stored position. The tray further comprises first and second mating portions proximal to the back portion of the tray. A first removable pin comprises an upper body and a lower body. The upper body of the first removable pin has a gripping member and the lower body of the first removable pin has threads. The lower body of the first removable pin is configured to selectively interface the tray and the chamber through the first substantially aligned apertures. A second removable pin comprises an upper body and a lower body. The upper body of the second removable pin has a gripping member and the lower body of the second removable pin has threads. The lower body of the second removable pin is configured to selectively interface the tray and the chamber through the second substantially aligned apertures. A first stopper is attached to the rear portion of the chamber and is configured to interface with the first mating portion while the tray is in the stored position. A second stopper is attached to the rear portion of the chamber and is configured to interface with the second mating portion while the tray is in the stored position.

The present invention is advantageous for providing a simple, lightweight and cost-effective spare tire retention system that involves a slidable storage tray that can be selectively prohibited from moving. Additional aspects, advantages, and novel features of the invention will be set forth in part in the description that follows, and in part will become apparent to those skilled in the art upon examination of the following or may be learned with the practice of the invention. The aspects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
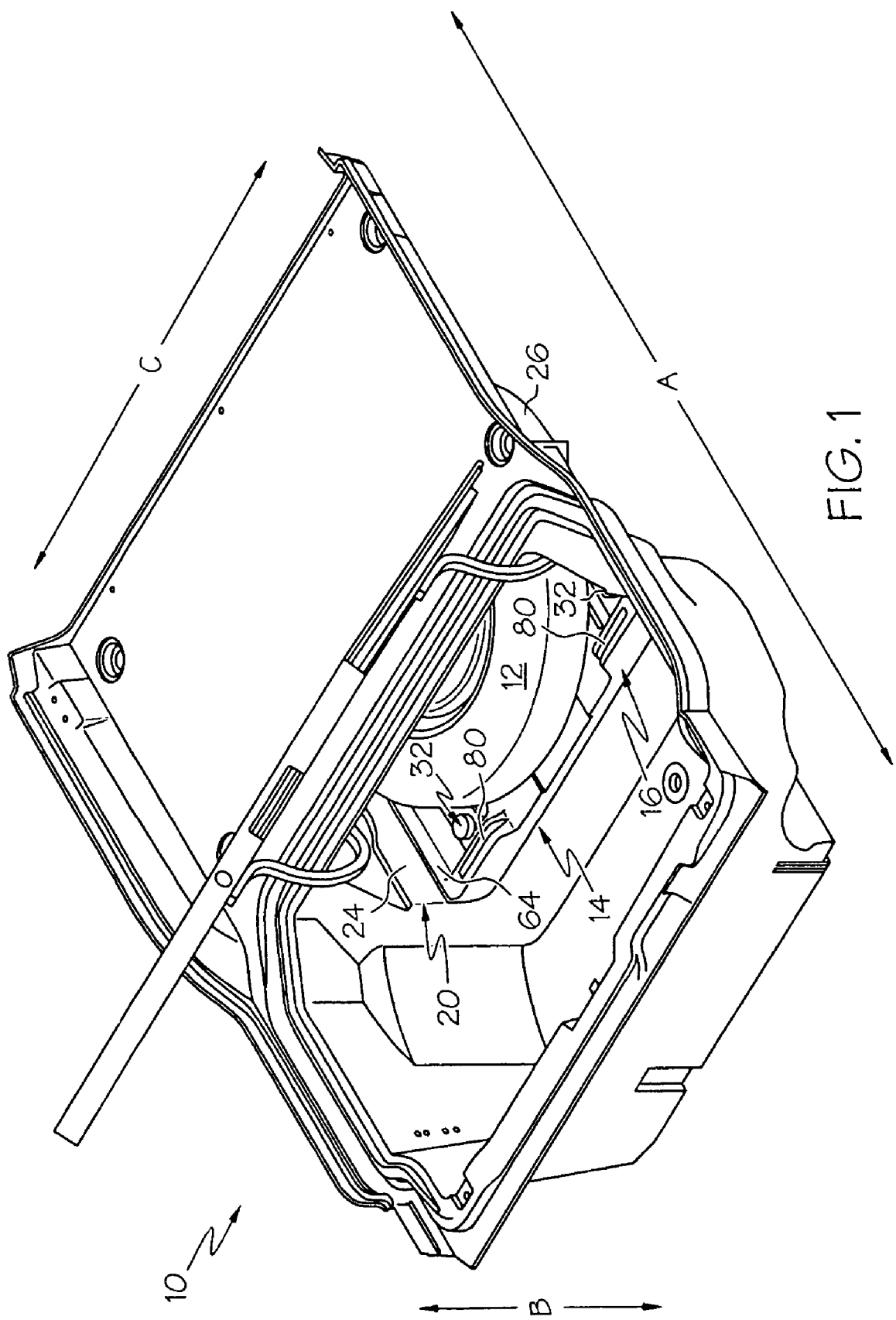
FIG. 1 is a perspective view depicting a storage compartment having a tire retention system in accordance with one exemplary embodiment of the present invention.

Exemplary embodiments of the present invention and its operation are hereinafter described in detail in connection with the views and examples of FIGS. 1, 2A-2B and 3-4, wherein like numbers indicate the same or corresponding elements throughout the views. FIG. 1 depicts a storage compartment 10, such as might be associated with the bed of a pickup truck or with the floor of an automobile. The storage compartment 10 can be configured to support a spare tire 12 beneath the cargo carrying area of the vehicle, thus protecting the spare tire 12 from theft and/or environmental damage (e.g., moisture and debris).

The storage compartment 10 is shown to include a retention system 14 for the spare tire 12. The retention system 14 is shown in FIGS. 1, 2A-2B and 3 to include a chamber 20 having a bottom portion 22, a left side portion 24, a right side portion 26, and a rear portion 28. The retention system 14 also includes a tray 16 that can be configured to support a spare tire 12. In some circumstances, the spare tire 12 might even be attached to the tray 16 (e.g., with straps or a tie-down stud/bolt).

Figure 2A:
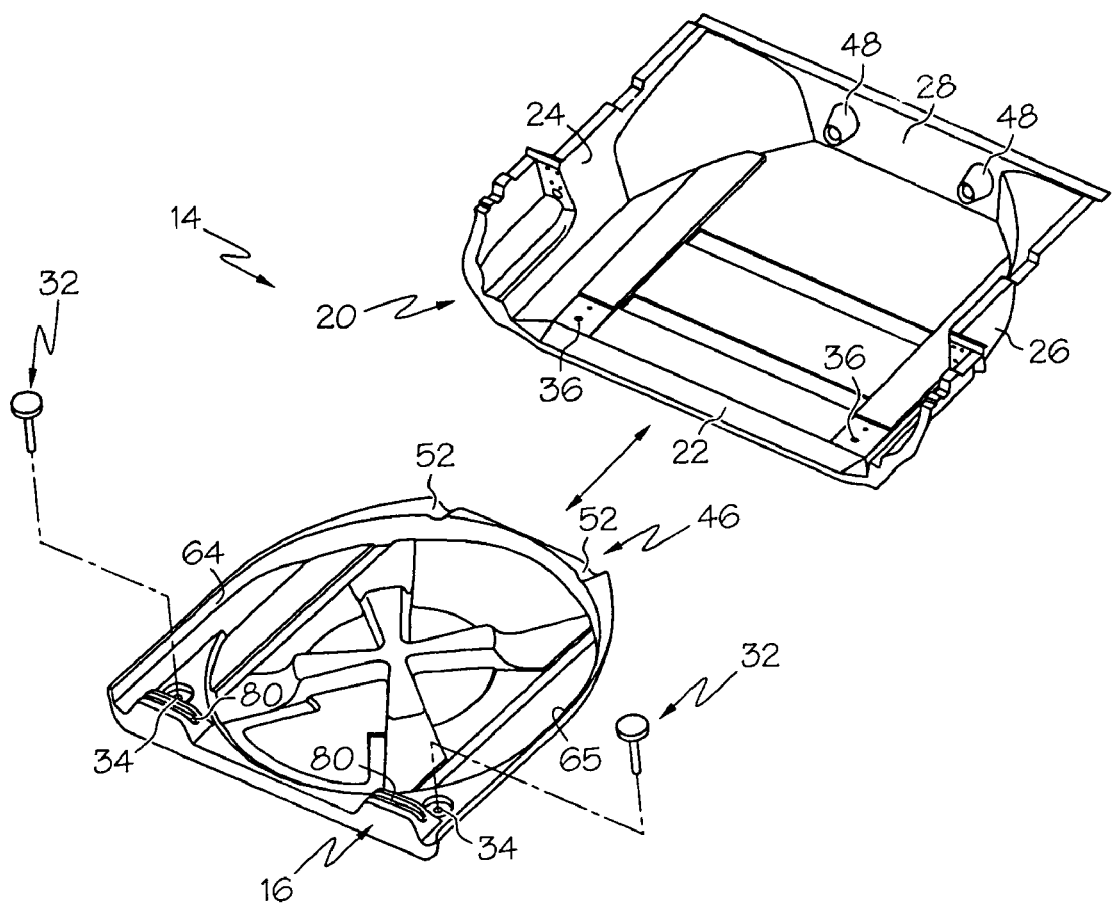
FIG. 2A is a perspective view depicting the tray and a portion of the chamber of the tire retention system of FIG. 1, wherein the tray is removed from the chamber portion.
Figure 2B:
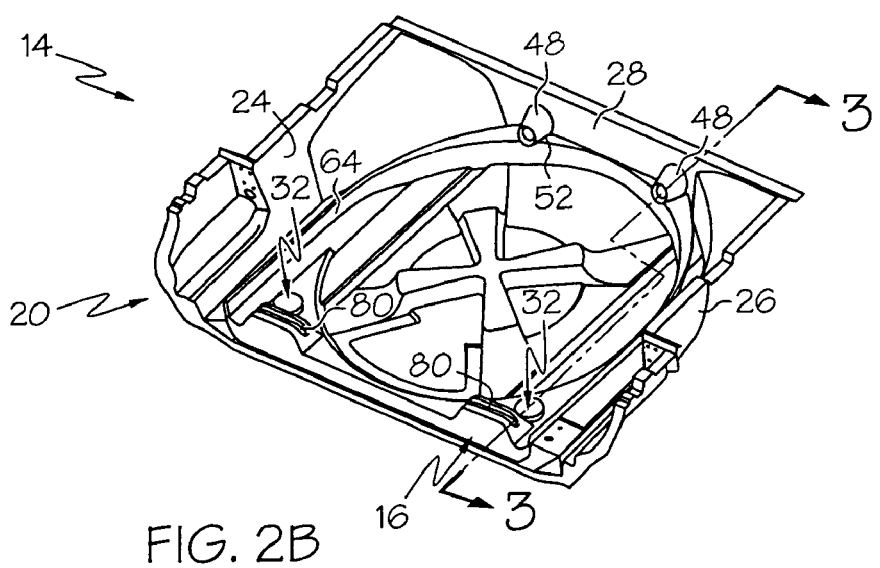
FIG. 2B is a perspective view depicting the tray and a portion of the chamber of the tire retention system of FIGS. 1 and 2B, wherein the tray is fully inserted into the chamber portion and is held therein by two pins and two stoppers.
Figure 3:
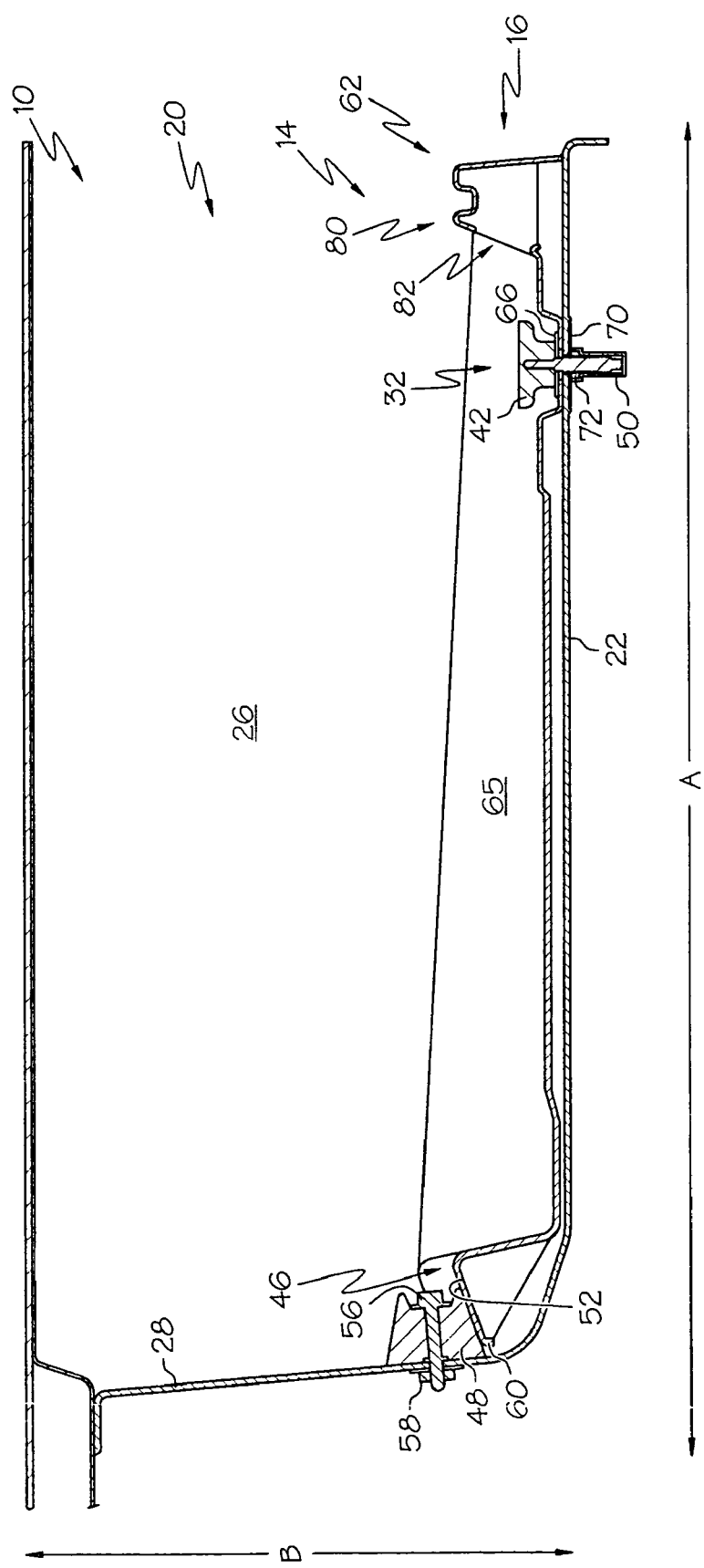
FIG. 3 is a cross-sectional view of the tire retention system of FIGS. 1 and 2A-2B taken along section lines 3-3 in FIG. 2B.

The tray 16 is configured to travel into and out from the chamber 20 in a first direction (direction A shown in FIGS. 1 and 3), between its stored and extended positions. When the tray 16 is in its stored position (as depicted in FIGS. 1, 2B and 3), the spare tire 12 supported upon the tray 16 is located such that it is relatively inaccessible to an operator of the vehicle. While in this stored position, the tray 16 is shown to rest upon and contact the bottom portion 22 of the chamber 20. The tray 16 can then slidingly engage the bottom portion 22 of the chamber 20 when it is moved in direction A between its stored and extended positions. In some embodiments (e.g., as shown in FIGS. 1, 2A, 2B and 3), the tray 16 might be substantially coplanar with and adjacent to the bottom portion 22 of the chamber 20 while the tray 16 is in its stored position. In other embodiments, the tray 16 might have a bottom surface that substantially corresponds in shape with the bottom portion 22 of the chamber 20. When the tray 16 is in its extended position (as shown for example in FIG. 2A), however, the spare tire 12 located upon the tray 16 can be freely accessed and removed from the tray 16 by an operator of the vehicle. The movement of the tray 16 between its stored and extended positions (in direction A) can be generally parallel relative to the bottom portion 22 of the chamber 20.

As shown in FIGS. 1, 2A-2B, and 3, the tray 16 can have one or more handles 80 which can be gripped by an operator. Through use of these handles 80, an operator can easily grab the tray 16 and move it between its stored and extended positions. As shown most clearly in FIG. 3, a handle 80 can comprise one or more openings 82 formed in the tray 16 near the front portion 62 of the tray 16. An operator can insert his or her fingers into the opening(s) 82 in order to achieve a good grip upon the tray 16.

The retention system 14 can be configured such that the tray 16 is substantially prevented from undesired movement with respect to the chamber 20 while the tray 16 is in its stored position. In particular, the tray 16 can be configured so that its left edge 64 and right edge 65 are closely adjacent to the left and right side portions 24, 26 of the chamber 20, respectively, while the tray 16 is in its stored position. By configuring the tray 16 in this manner, the tray 16 can be substantially prevented from moving from side to side (e.g., in direction C shown in FIG. 1) within the chamber 20 during vehicular travel.

One or more removable interconnecting members (e.g., pins 32) can be provided to selectively interface with both the tray 16 and the chamber 20 in order to substantially prevent the movement of the tray 16 relative to the bottom portion 22 of the chamber 20 along direction A. The interconnecting member(s) can thereby substantially prevent undesired movement of the tray 16 from its stored position to its extended position (along direction A), such as might otherwise occur during vehicular travel if such interconnecting member(s) were not provided. In the particular embodiment depicted in FIGS. 1, 2A-2B, and 3-4, a removable interconnecting member is shown to comprise at least one pin 32 (e.g., two pins 32, as shown in FIGS. 1, 2A and 2B) that can be selectively inserted through cooperating apertures 34, 36 that are substantially aligned in the tray 16 and the bottom portion 22 of the chamber 20, respectively. In alternate embodiments, an interconnecting member could comprise fewer or greater than two pins. It should also be appreciated that an interconnecting member might involve structures or devices other than pins, and/or might involve insertion through aperture(s) within other portions (e.g., 24, 26, or 28) of the chamber 20.

Figure 4:
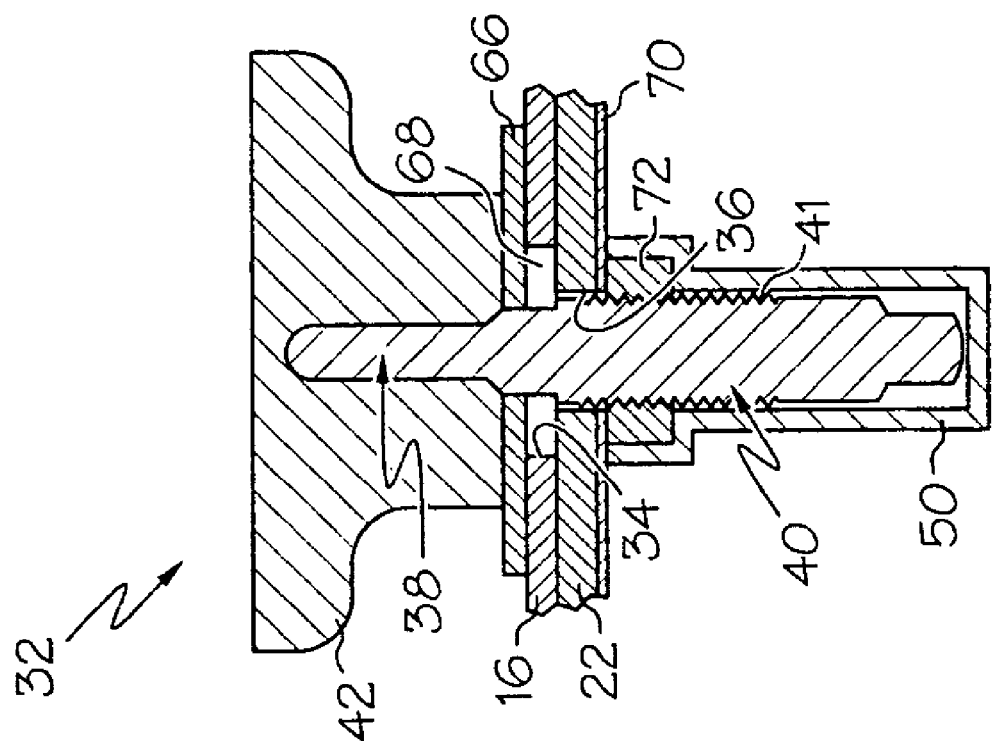
FIG. 4 is an enlarged cross-sectional view depicting the interface among the tray, the chamber and the pin that is shown in FIG. 3.

The cooperating apertures (e.g., 34, 36) can be substantially similar in size and shape (e.g., as shown in FIGS. 2A, 3 and 4), thereby permitting a removable interconnecting member (e.g., pin 32) to easily penetrate and interface both the tray 16 and the chamber 20, while further serving to prevent excessive relative movement between the tray 16 and the chamber 20 once this interface has been established. Although FIGS. 1, 2A-2B, and 3 depict the aligning apertures 34, 36 as being proximal to the front portion 62 of the tray 16 for ease of access for an operator to remove/insert the pin(s) 32, it should be understood that one or more removable interconnecting members could alternatively or additionally be provided nearer to the back portion 46 of the tray 16. Also, although FIGS. 1, 2A, and 2B depict the aligning apertures 34, 36 and associated removable interconnecting members (e.g., pins 32) as being located near the left and right edges 64, 65 of the tray 16, such interconnecting members might additionally or alternatively be located near the center of the tray 16 between the left edge 64 and the right edge 65, and/or in virtually any other location that would allow operator access as well as suitable interaction between the tray 16 and the chamber 20.

As shown most clearly in FIG. 4, the pin 32 can have an upper body 38 and a lower body 40. The upper body 38 can include a gripping member 42 so that an operator can effectively grasp the pin 32. The lower body 40 can be configured (e.g., elongated) such that it can effectively extend through aligned apertures (e.g., 34 and 36) in the tray 16 and the chamber 20. The lower body 40 may have a diameter that is similar to that of one or both of the aligned apertures 34, 36 so as to provide a tight interface between the tray 16 and the chamber 20, and to accordingly prevent excessive movement therebetween (e.g., along direction A). This similar diameter sizing can also help to reduce any likelihood that the pin 32 would vibrate upwardly and release itself from the aligned apertures 34, 36. In some embodiments, such as that depicted in FIG. 4, the pin 32 can be provided with a spacer 68 that has a diameter approximating that of the tray aperture 34, and that is configured to matingly interface with the tray aperture 34 when the pin 32 is fully inserted into the tray aperture 34. The pin 32 might also include a washer 66 for pressing against the top surface of the tray 16 when the pin 32 is inserted through the aperture 34. As will be appreciated, this washer 66 can be selected to have a wide enough diameter to distribute the holding force of the pin 32 across an adequate portion of the tray 16 so as to prevent compressive deformation upon the tray 16 by the pin 32.

When passing through the aperture 36 in the bottom portion 22 of the chamber 20, the lower body 40 can pass through a bracket plate 70 (e.g., formed from steel) that is associated with the bottom portion 22. This bracket plate 70 can be attached to the bottom portion 22 of the chamber 20 through use of any of a variety of known techniques, including, for example, adhesives, fasteners, welding, or mechanical interaction. In some embodiments of the present invention, the lower body 40 of the pin 32 can include threads 41, as shown in FIG. 4. In such circumstances, a threaded receptacle 72 (e.g., nut) can be associated with the bottom portion 22 and/or the bracket plate 70. For example, the threaded receptacle 72 might be welded to the bracket plate 70. The threads 41 of the lower body 40 can then engage the threaded receptacle 72 when the pin 32 is inserted into the aligned apertures 34, 36 and is rotated accordingly. When the threaded pin 32 is tightened into the threaded aperture 72 in this manner, in addition to selectively and substantially preventing undesired movement of the tray 16 between its stored and extended positions (along direction A), the pin 32 can also assist in preventing movement in a second direction (the B direction as shown in FIGS. 1 and 3) of the tray 16 (or at least the front portion 62 of the tray 16) relative to the bottom portion 22 of the chamber 20 while the tray 16 is in its stored position. This second direction (e.g., direction B) can be generally perpendicular to the first direction (e.g., direction A).

A shroud 50 can also be associated with the chamber 20 for selectively receiving a portion of a removable interconnecting member (e.g., pin 32) that is inserted into the aligned apertures (e.g., 34, 36). For example, as shown in FIG. 4, the shroud 50 can be associated with the bottom portion 22 of the chamber 20 and can substantially surround part of the lower body 40 of the pin 32 when the lower body 40 is inserted through the aperture 36 in the bottom portion 22 of the chamber 20. The shroud 50 can thereby serve to protect the lower body 40 of the pin 32 (and in some circumstances the threaded receptacle 72 as well, as shown in FIG. 4) from environmental conditions below the vehicle.

In another exemplary embodiment of the present invention, the shroud might provide a compressive fit upon the lower body of the pin to assist in securely holding the pin in place while the tray is retained within its stored position. Although the shroud 50 can be integrally formed with the chamber 20, it can alternatively be separately formed but can be attached directly or indirectly to the chamber 20 with fasteners, adhesives, press-fitting, or welding, for example. As shown in FIG. 4, the shroud 50 can be adhered to the threaded receptacle 72 and/or the bracket plate 70. In another exemplary embodiment, a shroud might comprise or be integrally formed with a threaded receptacle.

The upper body 38 is shown in FIG. 4 to include a gripping member 42 to facilitate simpler grasping (and rotation, where appropriate) of the pin 32 by an operator. Also, a portion of the upper body 38 (e.g., gripping member 42 and/or washer 66) can have a width exceeding the widths of the lower body 40, the aperture 36 in the bottom portion 22 of the chamber 20, and in some circumstances, the aperture 34 in the tray 16. This larger width can prevent the entire pin 32 from falling through the aligned apertures (e.g., 34, 36), and can further operate to contact the tray 16 and/or the bottom portion 22 in the vicinity of the apertures 34, 36 to act as a seal, for example. The gripping member 42 and/or washer 66 might even be formed from an elastic material (e.g., rubber) in order to better provide such a seal.

As shown in FIG. 4, the removable pin 32 can be completely separate from both the tray 16 and the chamber 20, although it should be appreciated that a removable pin might alternatively be moveably connected (e.g., with a hinge, cord, cable, or flexible flange) to either the tray 16 or to the chamber 20. In other embodiments, separate securement mechanisms (e.g., straps, cables, or flanges) might be provided to secure the pin 32 such that its lower body 40 remains disposed through the cooperating apertures 34, 36 while securement of the tray 16 within its stored position is desired.

The retention system 14 may also include one or more guide members (e.g., at least one stopper 48). An exemplary guide member is shown in FIGS. 2A and 2B to comprise a pair of stoppers 48 that are attached to the rear portion 28 of the chamber 20. The stoppers 48 are configured to selectively contact mating portions 52 on the back portion 46 of the tray 16 while the tray 16 is in its stored position. These mating portions 52 can be shaped or indented to matingly receive the stoppers 48.

Through interaction with the back portion 46 of the tray 16, a guide member (e.g., stoppers 48) can substantially prevent movement in a second direction (direction B, being generally perpendicular to direction A) of at least the back portion 46 of the tray 16 relative to the bottom portion 22 of the chamber 20 while the tray 16 is in the stored position. In some exemplary embodiments of the present invention, the guide member (e.g., stoppers 48) can substantially prevent movement (in direction B) of the tray 16 (e.g., the entire tray 16) relative to the bottom portion 22 of the chamber 20 while the tray 16 is in the stored position. In other exemplary embodiments of the present invention, the removable interconnecting member (e.g., pin(s) 32) can assist the guide member in preventing this movement (in the B direction) of the tray 16 (e.g., the entire tray 16) relative to the bottom portion 22 of the chamber 20. For example, while the tray 16 is in the stored position, the stoppers 48 can substantially prevent movement in the B direction of at least the back portion 46 of the tray 16 relative to the bottom portion 22 of the chamber 20, while the pin(s) 32 (when tightened into the threaded receptacle(s) 72) can assist in preventing the movement in the B direction of another portion of the tray 16 (e.g., the front portion 62) relative to the bottom portion 22 of the chamber 20.

In some exemplary embodiments, a guide member (e.g., a stopper) might also be configured to contact a back surface 60 of a tray 16 (shown in FIG. 3) while the tray 16 is in its stored position. By contacting the mating portions 52 and/or the back surface 60 of the tray 16 in this manner, the tray 16 can be effectively prevented from moving too far into the chamber 20 (in the A direction) so that the apertures 34, 36 can readily align for insertion of a removable interconnecting member (e.g., pin 32). The stoppers 48 can be attached to the rear portion 28 of the chamber 20 in any of a variety of specific manners. In one exemplary embodiment of the present invention, one or more fasteners can be provided to attach each stopper 48 to the rear portion 28 of the chamber 20. For example, each stopper 48 can be bolted to the rear portion 28 of the chamber 20 with a bolt 56 and a nut 58, as shown in FIG. 3. One or more metal washers or support plates (not shown) might also be provided (e.g., in contact with or connected with the bolt 56 and/or nut 58) to assist in distributing the mechanical forces associated with the stopper(s) 48 across a wider surface area of the rear portion 28 of the chamber 20.

In another exemplary embodiment of the present invention, each stopper might be provided integrally with the rear portion 28 of the chamber 20. The guide member (e.g., stoppers 48) can be formed from any of a variety of suitable materials, including, for example, rubber, plastic, wood, composites, fiberglass, metal, alloys, and/or combinations thereof. Also, although the guide member is depicted in FIGS. 2A and 2B as including two stoppers 48, it should be appreciated that an exemplary retention system might involve a guide member having only a single stopper, three or more such stoppers, or a single elongated member that extends substantially continuously across the entire width of the rear portion of the chamber, for example.

The manner of using the exemplary restraint apparatus of FIGS. 1, 2A-2B, and 3-4 will now be discussed. When an operator wishes to access the spare tire 12 stored upon the tray 16, the operator can remove (e.g., by unscrewing) the pins 32 from the chamber 20. The operator can then pull the tray 16 in the A direction by grabbing the handles 80 on the tray 16. Through this action, the tray 16 can be moved from its stored position to its extended position. As the tray 16 begins to leave its stored position, the back portion 46 of the tray 16 disengages stoppers 48 that are attached to the rear portion 28 of the chamber 20. When the tray 16 is sufficiently pulled such that it reaches its extended position, an operator can remove the spare tire 12 from the tray 16. An operator may then, if so desired, place a damaged tire upon the tray 16 for storage until the damaged tire can be repaired.

After the damaged tire is placed upon the extended tray 16, an operator may then press inwardly on the handles 80 of the tray 16, thereby moving the tray 16 from its extended position to its stored position. This movement continues until the back portion 46 of the tray 16 contacts the stoppers 48 that are attached to the rear portion 28 of the chamber 20. At this point, the apertures 34 in the tray 16 should substantially align with the apertures 36 in the bottom portion 22 of the chamber 20. An operator can then finish securing the tray 16 in its stored position by inserting the pin(s) 32 into the aligned apertures 34, 36.

It is important to note that the components of an exemplary retention system can be formed from various materials known and appreciated by those skilled in the art. For example, the materials could include metals, alloys, plastics, wood, composites or combinations thereof. Also, although the specific embodiments discussed herein primarily relate to the use of an exemplary retention system in conjunction with a vehicle, it should be understood that a retention system in accordance with the present invention can also be associated with other types of motor vehicles and non-motor vehicles, including but not limited to cars, sport-utility vehicles, recreational vehicles, construction equipment, trailers, campers, and a variety of other vehicles.

The foregoing description of exemplary embodiments and examples of the invention has been presented for purposes of illustration and description. These examples and descriptions are not intended to be exhaustive or to limit the invention to the forms described. Numerous modifications are possible in light of the above teachings. Some of those modifications have been discussed, and others will be understood by those skilled in the art. It is hereby intended that the scope of the invention be defined by the claims appended hereto.

What is claimed is:

1. A retention system for a spare tire, the retention system comprising:
    a compartment including a chamber, the chamber having a bottom wall, a left wall, a right wall, and a rear wall;
    a tray comprising a spare tire support surface and a back portion having an upper surface, the tray being movable in a first direction relative to and in sliding engagement with the bottom wall of the chamber between an extended position and a stored position, in which extended position the spare tire support surface is at least substantially disposed within the compartment while providing removal and stowage access for a spare tire with respect to the compartment, wherein the bottom wall extends from the left wall to the right wall and beneath the entirety of the spare tire support surface when the tray is in the stored position;
    at least one removable interconnecting member configured to selectively interface with both the tray and the chamber for substantially preventing movement of the tray in the first direction; and
    at least one guide member attached to the rear wall and having a lower surface configured, when the tray is in the stored position, to contact the upper surface for urging the back portion of the tray into contact with the bottom wall of the chamber to substantially prevent movement of the back portion of the tray in a second direction relative to the bottom wall of the chamber, the second direction being generally perpendicular to the first direction.

2. The retention system as recited in claim 1, wherein the tray further comprises at least one handle, each of said at least one handle comprising an opening formed in the tray and configured to receive an operator's fingers to facilitate gripping of the tray.

3. The retention system as recited in claim 1, wherein the at least one removable interconnecting member is configured to assist the at least one guide member in preventing movement of the tray in the second direction relative to the bottom wall of the chamber while the tray is in the stored position.

4. The retention system as recited in claim 1, wherein the tray is planar and substantially parallel with the bottom wall of the chamber while the tray is in the stored position.

5. The retention system as recited in claim 1, wherein the at least one guide member is configured to:
    not contact the tray while the tray is in the extended position.

6. The retention system as recited in claim 1, wherein the chamber and the tray define cooperating apertures, and wherein the at least one removable interconnecting member interfaces the tray and the chamber through the cooperating apertures.

7. The retention system as recited in claim 6, wherein the cooperating aperture of the chamber is defined by the bottom wall of the chamber.

8. The retention system as recited in claim 6, wherein the cooperating apertures are substantially similar in size and shape.

9. The retention system as recited in claim 6, wherein the at least one removable interconnecting member comprises a pin.

10. The retention system as recited in claim 9, wherein the pin comprises an upper body and a lower body.

11. The retention system as recited in claim 10, wherein the upper body comprises a gripping member.

12. The retention system as recited in claim 10, wherein the lower body comprises threads.

13. The retention system as recited in claim 12, further comprising a threaded receptacle being associated with the cooperating aperture of the chamber and being configured for selectively receiving the threads of the pin.

14. A retention system for a spare tire, the retention system comprising:
   a compartment including a chamber, the chamber having a bottom wall, a left wall, a right wall, a rear wall, and an aperture;
   a tray comprising a spare tire support surface and a back portion having an upper surface, the tray being movable in a first direction relative to and in sliding engagement with the bottom wall of the chamber between an extended position and a stored position, the tray defining an aperture that substantially aligns with the aperture in the chamber while the tray is in the stored position, in which extended position the spare tire support surface is at least substantially disposed within the compartment while providing removal and stowage access for a spare tire with respect to the compartment, wherein the bottom wall extends from the left wall to the right wall and beneath the entirety of the spare tire support surface when the tray is in the stored position;
   a removable pin configured to selectively interface the tray and the chamber through the substantially aligned apertures for substantially preventing movement of the tray in the first direction, wherein the pin comprises an upper body and a lower body, the upper body having a gripping member, the lower body having threads and being configured to selectively interface the aperture in the chamber; and
   at least one stopper being attached to the rear wall of the chamber, said stopper having a lower surface configured, when the tray is in the stored position, to contact the upper surface for urging the back portion of the tray into contact with the bottom wall of the chamber to substantially prevent movement of the back portion of the tray in a second direction relative to the bottom wall of the chamber, the second direction being generally perpendicular to the first direction.

15. The retention system as recited in claim 14, wherein the bottom wall of the chamber defines the aperture in the chamber.

16. The retention system as recited in claim 14, further comprising a threaded receptacle being associated with the aperture of the chamber and being configured for selectively receiving the threads of the removable pin.

17. The retention system as recited in claim 14, wherein the substantially aligned apertures are substantially similar in size and shape.

18. The retention system as recited in claim 14, wherein the at least one stopper comprises two stoppers.

19. The retention system as recited in claim 14, further comprising a second removable pin.

20. The retention system as recited in claim 14, wherein the tray further comprises at least one handle, each of said at least one handle comprising an opening formed in the tray and configured to receive an operator's fingers to facilitate gripping of the tray.

21. The retention system as recited in claim 14, wherein the removable pin is configured to assist the at least one stopper in preventing movement of the tray in the second direction relative to the bottom wall of the chamber while the tray is in the stored position.

22. The retention system as recited in claim 14, wherein the tray is planar and substantially parallel with the bottom wall of the chamber while the tray is in the stored position.

23. The retention system as recited in claim 14, wherein the at least one stopper is configured to:
   not contact the tray while the tray is in the extended position.

24. A retention system for a spare tire, the retention system comprising:
   a compartment including a chamber, the chamber having a bottom wall, a left wall, a right wall, and a rear wall, the bottom wall defining a first aperture and a second aperture;
   a tray having a front portion and a back portion having an upper surface, the tray comprising a spare tire support surface and being movable in a first direction relative to and in sliding engagement with the bottom wall of the chamber between a stored position and an extended position, the tray defining first and second apertures proximal to the front portion of the tray, the first aperture in the tray substantially aligning with the first aperture in the chamber while the tray is in the stored position, and the second aperture in the tray substantially aligning with the second aperture in the chamber while the tray is in the stored position, in which extended position the spare tire support surface is at least substantially disposed within the compartment while providing removal and stowage access for a spare tire with respect to the compartment, wherein the bottom wall extends from the left wall to the right wall and beneath the entirety of the spare tire support surface when the tray is in the stored position;
   a first removable pin comprising an upper body and a lower body, the upper body having a gripping member, the lower body having threads, the lower body being configured to selectively interface the tray and the chamber through the first substantially aligned apertures;
   a second removable pin comprising an upper body and a lower body, the upper body having a gripping member, the lower body having threads, the lower body being configured to selectively interface the tray and the chamber through the second substantially aligned apertures; and
   a first stopper and a second stopper, each being attached to the rear wall of the chamber and having a respective lower surface configured, when the tray is in the stored position, to contact the upper surface for urging the back portion of the tray into contact with the bottom wall of the chamber to substantially prevent movement of the back portion of the tray in a second direction relative to the bottom wall of the chamber, the second direction being generally perpendicular to the first direction.

25. The retention system as recited in claim 24, wherein the first and second stoppers are configured to:
   not contact the tray while the tray is in the extended position.

* * * * *